Nov. 11, 1941.  D. C. SIMPSON  2,262,439

LOCK WASHER

Filed Aug. 14, 1939

Inventor

D. C. Simpson

By Clarence A. O'Brien
and Hyman Berman
Attorneys

Patented Nov. 11, 1941

2,262,439

UNITED STATES PATENT OFFICE 2,262,439

LOCK WASHER

Dan C. Simpson, Corona, N. Mex.

Application August 14, 1939, Serial No. 290,066

1 Claim. (Cl. 151—36)

This invention relates to a lock washer, the general object of the invention being to provide a split spring washer so constructed that parts thereof will bite firmly into a work piece and a nut to prevent the nut from being loosened under temperature changes, vibrations, etc. with means whereby the nut and washer can be readily loosened and removed from the bolt when desired or necessary.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 2:
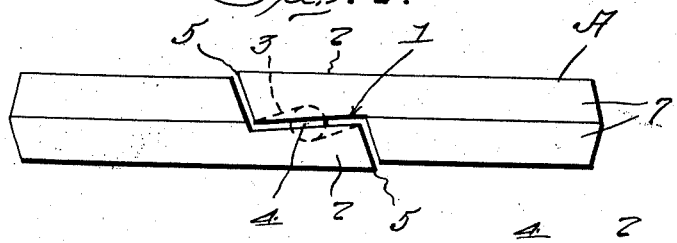
Figure 2 is an edge view thereof looking toward the slotted part.
Figure 3:
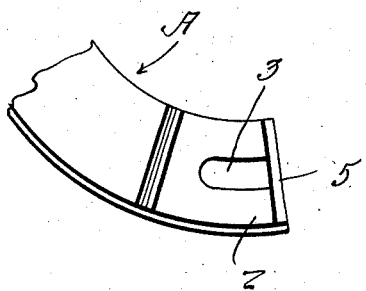
Figure 3 is a fragmentary plan view looking toward one end of the device.
Figure 4:
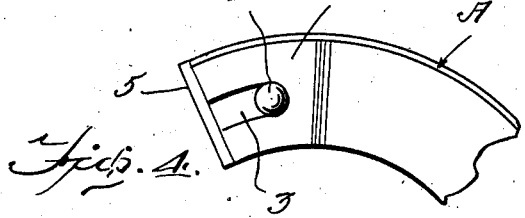
Figure 4 is a similar view looking toward the other end of the device.

The washer is shown at A and is formed with a substantially Z-shaped slot 1 therein which makes the washer of split construction and prodes the overlapping end portion 2. As shown the end portions of the slot incline outwardly in opposite directions from the circumferentially extending part of the slot and this circumferentially extending part slightly slopes from one end to the other as clearly shown in Figure 2. The inner face of each overlapping part 2 is formed with a groove 3 which gradually increases in depth from its outer end to its inner end, the inner end being arranged substantially at the center of the overlapping part 2 and these grooves receive a spherical member 4 which facilitates movement of one end part 2 relative to the other. The sloping end portions of the slot provide a beveled end for each overlapping part and each beveled end forms a biting wedge 5, these portions 5 biting into the metal of the work piece and of the nut when the washer expands or spreads. Thus the washer prevents relative movement of the nut and work piece so that the nut is firmly held against movement on the bolt.

Figure 1:
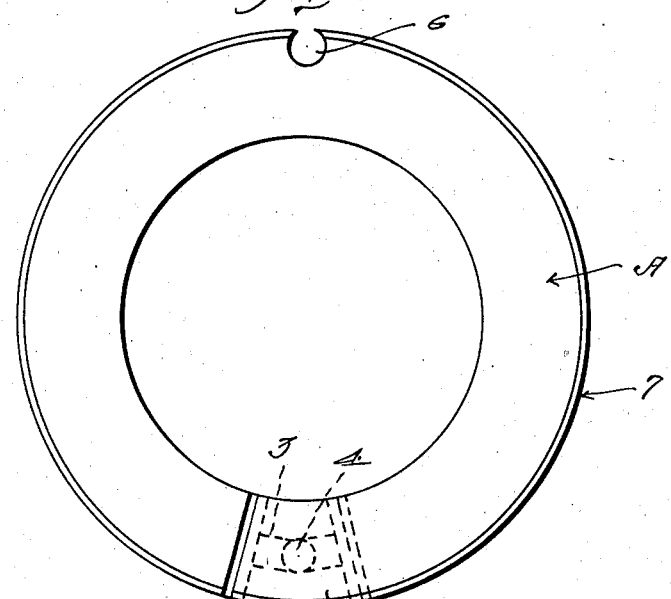
Figure 1 is a plan view of the improved device.

In order to weaken that part of the washer which is opposite the slotted part a notch or hole 6 is formed in said part which passes through the outer circumference of the washer as shown in Figure 1 and the exterior circumference of the washer is beveled from its center to its side edges as shown at 7, this facilitating the placing of a wrench over the washer and nut, this wrench acting to prevent the washer from spreading and thus the nut and washer can be readily removed by the wrench.

If desired a ball may be placed in the hole 6 to check the spreading action of the washer.

As will be seen when the nut is tightened against the washer and the washer against the work piece the ball 4 will tend to press the overlapping ends away from each other to cause the parts 5 to bite more firmly into the parts.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A washer of the class described comprising a ring-shaped body having a Z-shaped slit therein providing overlapping ends, the central portion of the slit extending circumferentially of the body but sloping slightly from one end to the other and with each end portion of the slit extending at a slight slope to the axis of the body and in a direction to make the extremity of an overlapping end slope outwardly from its inner corner to its outer corner, to provide a biting edge at the outer corner, the inner faces of said overlapping ends having grooves therein, each groove extending from an intermediate part of an overlapping end to its extremity with each groove gradually increasing in depth from its outer end to its inner end and a spherical member located between the two overlapping ends and having portions seated in the grooves.

DAN C. SIMPSON.